3,498,905
CONTINUOUS FLOW ELECTROPHORESIS
APPARATUS
Allen Strickler, Fullerton, Calif., assignor to Beckman Instruments, Inc., a corporation of California
Continuation-in-part of application Ser. No. 465,020, June 18, 1965. This application Feb. 21, 1966, Ser. No. 538,501
Int. Cl. B01k 5/00
U.S. Cl. 204—299                                26 Claims

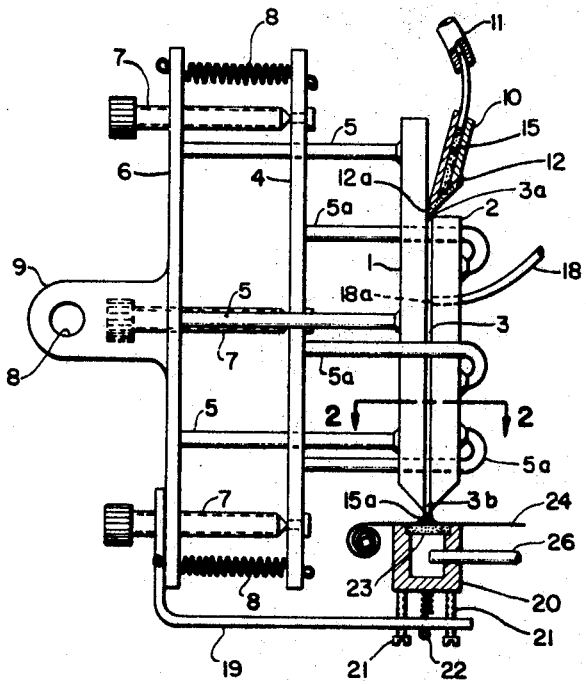
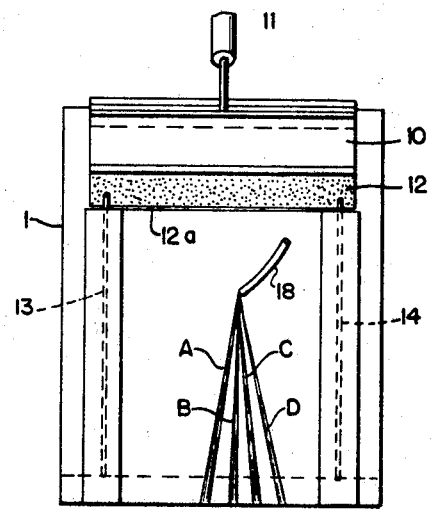
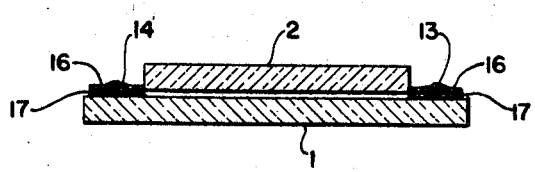
FIG. 1
FIG. 3
FIG. 2
INVENTOR.
ALLEN STRICKLER

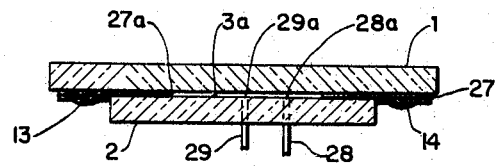
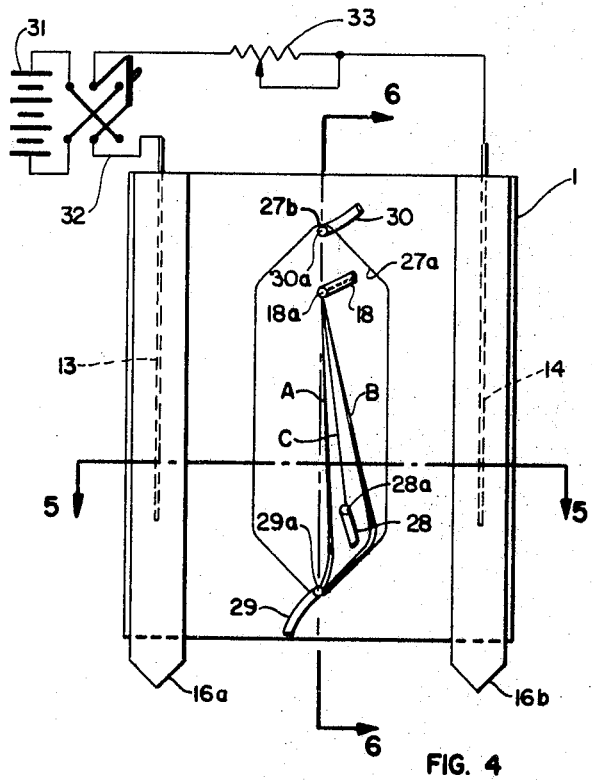
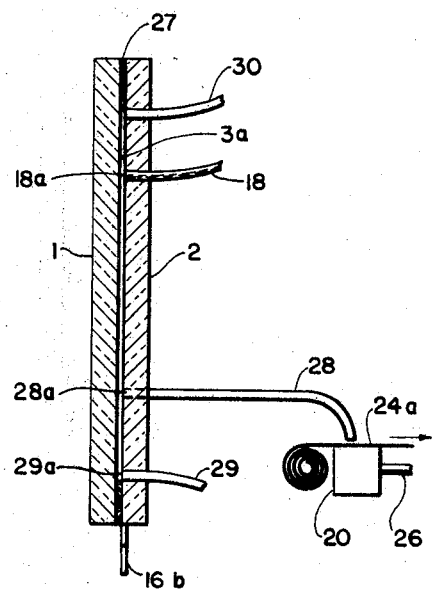
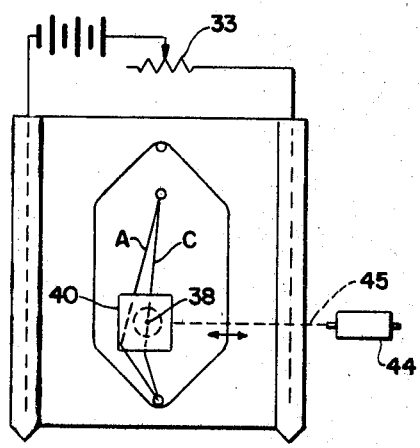
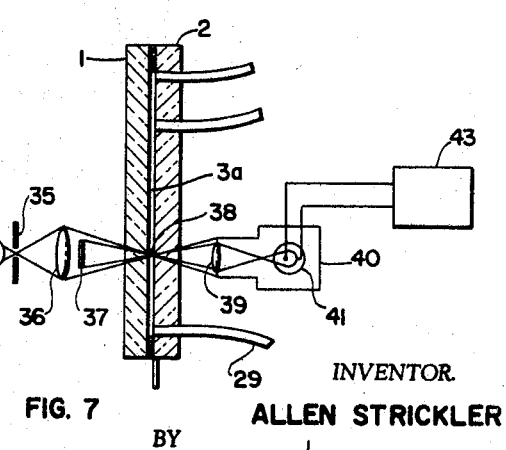
INVENTOR.
ALLEN STRICKLER
ATTORNEY United States Patent Office 3,498,905
Patented Mar. 3, 1970

ABSTRACT OF THE DISCLOSURE

A continuous particle electrophoresis apparatus including a pair of substantially flat plates supported in spaced apart, parallel, face-to-face relationship to define an interspace through which an electrolyte freely flows and means for feeding the electrolyte from a single point into the interspace as a stable flowing electrolyte sheet.

---

This application is a continuation-in-part of application Ser. No. 465,020, filed June 18, 1965, now abandoned.

The present invention relates generally to continuous flow electrophoresis apparatus.

Electrophoresis in general relates to the phenomenon which occurs when charged particles in a liquid carrier medium are subjected to an electrical field and forced to migrate in one direction or the other depending upon the strength of the fields and the mobility of the particular particles. In continuous flow electrophoresis an electrolyte or buffer solution is forced to flow in a uniform film upon which is superimposed an electrical field at some angle to the flow. A sample is continuously introduced at some point into the film of electrolyte where it flows in a narrow band in the absence of the applied field. When an electrical field gradient is imposed on the film of electrolyte, the sample particles are separated under the influence of the electrical field into various particle groups or components depending upon the electrophoretic mobility of the respective particles, the strength of the field and the length of time the particles remain in the field. The factors which affect the mobility on the particles includes the surface charge density of the particle, the thickness of the electric double layer around the particle and the viscosity and dielectric constant of the electrolyte or buffer medium. Particles of similar mobility are concentrated in distinct bands or zones during movement of the sample stream along with the moving film of buffer solution.

In some forms of electrophoretic apparatus, a hanging sheet of filter paper serves as an anticonvection medium or curtain upon which the electrolyte or buffer solution is suitably fed where it flows downwardly under the influence of gravity. Electrodes are attached at points along the sides of the curtain to apply an electrical field across the flowing electrolytic film. One example of such an electrophoresis device is disclosed in the U.S. Patent No. 2,879,217, Durrum et al., entitled, "Continuous Electrophoresis Apparatus With Laminated Wick Electrodes" which is assigned to Beckman Instruments, Inc., assignee of the present invention. Additional prior art illustrating continuous electrophoresis apparatus is the U.S. Patent No. 3,125,500 Grassman et al., entitled, "Device For The Execution Of The Carrier Free Continuous Electrophoresis."

While the prior art has generally been confined to the separation of components in solution, it is an object of the present invention to provide an improved apparatus for fractionation and monitoring of particles in suspension.

It is sometimes desirable to deposit the bands of separated particles on a carrier medium for convenient future examination. For example, in using microscopic examination, it is desirable to collect the particles on a microporous tape or slide. In attempting to deposit the particles separated in a free flowing electrophoresis apparatus on a tape or slide, it is difficult to prevent mixing of the particle zones and loss of zone resolution due to lateral movement or flow of the liquid carrier film as it is deposited upon the tape or slide.

Accordingly, it is an object of the present invention to provide an electrophoresis apparatus having an improved arrangement for deposition of the separated particle bands onto a collection means.

It is a more specific object of the present invention to provide an improved arrangement for a continuous flow electrophoresis apparatus for deposition of the separated particle bands onto a collection tape without lateral mixing or loss of resolution of the separated bands.

In the application of the buffer or electrolyte in a free-film flowing between a pair of glass plates, such as those disclosed in the aforementioned Grassman patent, it is necessary to introduce the film of electrolyte or buffer solution into the region between the plates in a manner so as to provide as uniform a flow between the plates as possible. Unless the flow through the interspace between the plates is uniform there are pressure and velocity variations in the interspace which tend to disrupt the uniform migration of the particles under the influence of the electrical field.

It is, therefore, a further object of the present invention to provide a new and improved arrangement in an electrophoresis apparatus for distributing the electrolyte or buffer solution so that it forms a uniform flowing film having constant pressure and flow characteristics throughout the width of the film in the electrical field.

It is another object of the present invention to provide an electrophoresis apparatus having an improved arrangement for quickly sampling or scanning for detection purposes one or more of the sample particle bands in the flowing film.

Further objects and advantages of the invention will become apparent as the following description proceeds, and the features of novelty which characterize the invention will be pointed out with particularity in the claims annexed to and forming a part of this specification.

In accordance with the present invention there is provided a pair of flat plates of electrically insulated material disposed substantially parallel to each other and defining the interspace into which is fed an electrolyte or buffer solution. In a preferred embodiment of the invention the electrolyte is fed into the interspace through a permeable membrane disposed above the interspace extending the width of the opening thereto. The permeable membrane forms the bottom of a cavity or hopper which receives the electrolyte from a suitable source. The impedance of the permeable membrane causes the liquid to flow uniformly through the permeable element and to be uniformly discharged along the entire length of said interspace opening at a uniform and constant flow rate. In order to make an electrophoretic separation of sample particles introduced into the flowing film of electrolyte an electrical potential gradient is applied across the electrolyte flowing in the interspace which separates sample particles continuously introduced at a point on the electrolytic film.

As a further aspect of the invention, there is provided at the output end of the interspace between the plates a microporous membrane upon which the output flow of liquid and separated particle bands is deposited. In order to prevent lateral flow of the electrolyte or buffer solution during the depositing there is provided a means for immediately drawing the electrolyte through the microporous membrane which is permeable to the flow of the liquid electrolyte but impermeable to the flow of sample particles.

In an alternative arrangement, the electrolyte is fed into the interspace via a single hole near the top of one of the plates. With the aid of a suitably shaped gasket or spacer adjacent this hole, the flow is caused to fan out and proceed uniformly along parallel lines down the remaining portion of the interspace between the plates.

For a better understanding of this invention, reference may be had to the accompanying drawings in which:

FIG. 1 is a side elevation view, partially in cross-section, illustrating the electrophoresis apparatus of the invention;

FIG. 2 is a cross-sectional view taken along line 2—2 of FIG. 1 showing the electrophoresis plates and electrodes;

FIG. 3 is a somewhat schematic view in which the front plate of the apparatus is transparent so that the introduction of and separation of a sample within the interspace is clearly illustrated;

FIG. 4 is a somewhat schematic front view of another embodiment of the invention illustrating an arrangement for picking off separated sample bands from the interspace between the plates;

FIG. 5 is a cross-sectional view taken along line 5—5 of FIG. 4;

FIG. 6 is a cross-sectional view taken along line 6—6 of FIG. 4 showing more clearly an alternate arrangement for uniformly supplying and collecting the flowing film;

FIG. 7 is a cross-sectional view of the plates illustrating in schematic form an alternative method of analyzing the separated bands by means of an optical scanning device;

FIG. 8 is a schematic front view illustrating the apparatus of FIG. 7 for optically scanning the separated bands;

Figure 9:
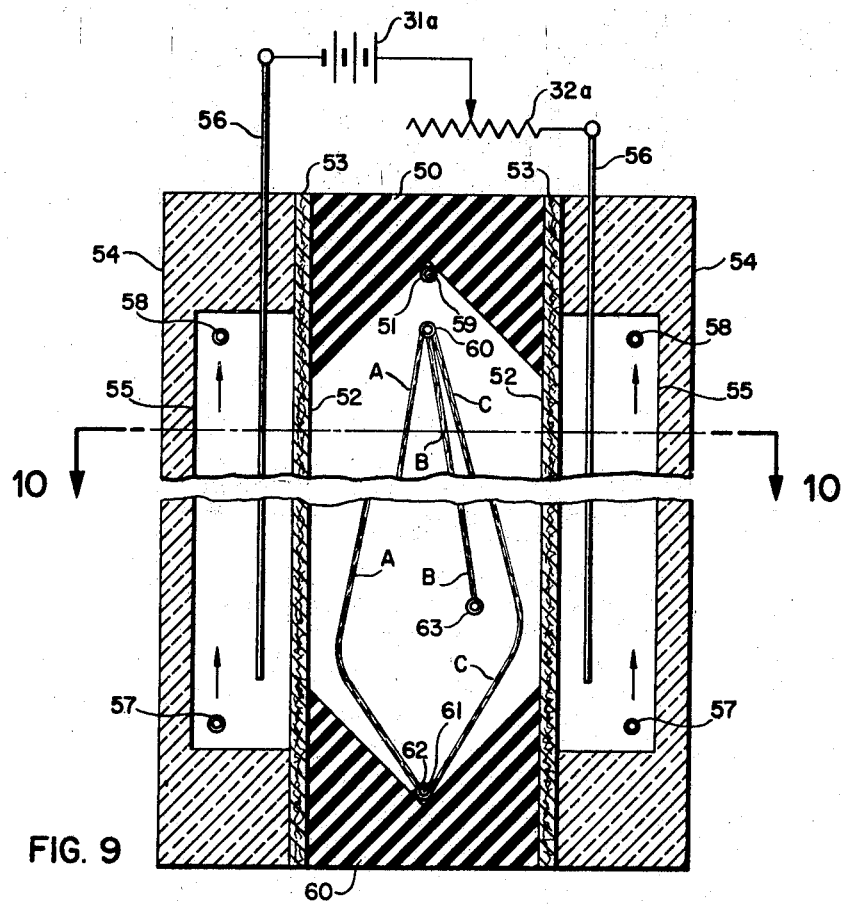
FIG. 9 is a cross-sectional front view of an exemplary, alternative apparatus for practicing the present invention.

Referring now to FIGURES 1 and 2 there is shown a preferred embodiment of the continuous flow electrophoresis apparatus which includes a pair of substantially flat plates 1 and 2 of electrically insulating material which are supported in face-to-face relationship and substantially parallel to each other to define an electrophoresis cavity or interspace 3 therebetween. Preferably the plates 1 and 2 are made of glass and their adjacent surfaces are made flat to within a few wavelengths of sodium light. In a preferred embodiment of the invention, the plates were made 6 millimeters thick and the front plate 2 was 5 centimeters wide by 6½ centimeters high. The plates were separated to provide an interspace width of 0.1 mm. The back plate 1 is made somewhat longer in order to accommodate the deposition of the buffer solution above the interspace 3. The back plate 1 is also made somewhat wider in order to accommodate means for applying an electrical potential gradient to a liquid electrolyte or buffer solution flowing in the interspace. The particular dimensions are not considered critical but merely exemplary and it will be understood that the particular dimensions of the glass plates are variable depending upon the specific purpose for which the apparatus is to be used.

Means are provided for supporting the plates 1 and 2 in closely spaced relationship, comprising a pair of support frames 4 and 6 having a plurality of arms 5 and 5a extending outwardly and supporting the plates along their exterior surfaces. Support frame 4 is made adjustable with respect to frame 6 so that the relative positions of the plates 1 and 2 may be adjusted and relative dimensions of interspace 3 increased or decreased. In order to adjust the glass plates 1 and 2 there are provided a plurality of kinematic adjustment screws 7 threaded through frame 6 and rotatably supported upon frame 4. Tension springs 8 are attached respectively to the opposite ends of the frames 4 and 6 and tend to force the frames toward each other against the kinematic adjustment screws 7. Kinematic adjustment screws 7 also serve to support the frame 4 in position with respect to frame 6. The entire apparatus is supported for rotational orientation about a plate tilt axis 8 by means of a strut 9 attached to support frame 6.

Means are provided for feeding an electrophoresis medium in the form of an electrolyte or buffer solution (generally designated by the reference number 15) into the interspace 3 between the two glass plates. Electrolyte is fed in a steady laminar flow as a sheet into the interspace to form a film having substantially the width of the interspace. The feed means include a hopper 10 into which an electrolyte is fed through a tube 11, or a plurality of tubes, at a predetermined flow rate. Pumping means (not shown) forces the electrolytic solution through the tubular member 11 into the hopper 10 which is disposed adjacent the surface of the upper section of the plate 1, which is substantially greater in length than the front plate 2. In the illustrated embodiment, the hopper 10 is beveled at its lower end to provide a knife-like edge adjacent the upper surface of glass plate 1. The lower end and outlet opening from the cavity of the hopper 10 is covered by a feed means in the form of a member 12 permeable to the electrolytic liquid and having a relatively high flow impedance compared with the flow impedance of the interspace 3. In a preferred embodiment of the invention the permeable member 12 is formed of a microporous membrane having its lower edge 12a in contact with the surface of the plate 1.

The buffer solution is forced to flow, due to the pressure of the pumping means, through the hopper 10 where it spreads evenly across the permeable member or microporous membrane 12 in an evenly distributed sheet down the surface of the plate 1. The hopper 10 and its microporous membrane 12 are disposed only a short distance above the opening 3a to the interspace so that the electrolytic solution flows along short substantially equal flow paths on the surface of the plate 1 into the opening 3a of the interspace.

Means are provided for applying an electrical potential gradient laterally across the electrolytic sheet flowing within the interspace. These means comprise a pair of electrodes 13 and 14 (best seen in FIGS. 2 and 3) lying adjacent the sides of the front plate 2 and sandwiched between moistened strips 16 and 17 of filter paper that are deposited on the flat surface of the back plate 1. The strips 17 of filter paper also serve to close the interspace, the liquid, however, being maintained in the interspace mainly by capillary attraction. As may best be seen in FIG. 3, the feed hopper 10 and permeable membrane 12 for delivering the electrolytic film to the interspace are made sufficiently wide so that a portion of the electrolytic solution flows down the filter paper and continually moistens this paper. The moistened filter strips 17 are in contact with the electrodes 13 and 14 and contact the flowing electrolyte within the interspace so that there is a potential force normal to the direction of flow of the electrolyte exerted upon any charged particles in the electrolytic solution.

Means are provided for injecting a sample mixture into the electrolytic film at a predetermined point within the interspace. In the illustrated embodiments, the sample suspension is injected into the electrolytic sheet in the interspace by means of a fine nylon tube 18 inserted through a hole in the front plate 2. In the tested embodiment of the invention, the opening 18a at the tip of the tube leading into the interspace was .05 millimeter in diameter and the hole was disposed about one-third of the way down from the upper edge of the front plate 2. Pumping or gravity flow means (not shown) supplies a sample suspension through the tube 18 at a uniform pressure and flow rate.

In accordance with one aspect of the invention, the free flowing electrophoresis apparatus includes means for uniformly depositing the sample bands onto a collection medium as the sample and electrolyte emerge from the interspace outlet edge 3b. More specifically, as may be seen in FIGURE 1, the sample collection means includes a support bracket 19 attached to the support frame 6 and extending outwardly below the vertically supported plates 1 and 2. Supported above the bracket 19 is an electrolyte trap 20 which is retained by a pair of kinematic adjustment screws 21 directly below the outlet edge 3b or outlet opening between the pair of plates 1 and 2. An extension spring 22 serves to support the trap against the force of the kinematic adjustment screws 21. Mounted across the opening of the trap is a perforated or porous plate 23 through which the electrolytic solution is drawn as it is discharged from the interspace between the plates. Across the upper surface of the porous plate 23 there is moved a porous collector medium 24 which is preferably formed of a microporous tape, permeable to the flow of electrolyte but impermeable to the passage of sample particles. The microporous tape 24 is slowly moved at a uniform rate over the surface of the porous plate 23. The desired rate of movement of the microporous tape 24 depends upon the rate of deposition of particles and may be adjusted over a wide range to obtain a sutiable deposition density without clogging of the tape.

Preferably the microporous tape 24 and the porous plate 23 combine to provide a relatively high impedance to the flow of the liquid electrolyte as compared to the flow impedance of the interspace. In order to draw the liquid electrolyte through the microporous tape and into the trap before it has an opportunity to flow and spread or mix the particle fractions, a partial vacuum is maintained within the cavity of the trap 20. The electrolytic liquid is drawn or sucked through microporous tape 24 and the sample particles are deposited on the tape directly below the opening between the plates. The lower edges of the plates are preferably chamfered and a small gap is formed between the plates and the microporous tape 24. By properly adjusting the position of the trap 20 and tape 24, there is formed a meniscus 15a along the chamfered outlet edges of the plates filling the gap between the opening 3b and porous tape 24. When this meniscus is properly formed, depending upon the spacing of the tape 24 from the plates, the flow rates of the electrolyte and the viscosity of the liquid, the sample bands are conducted along short and substantially equal flow paths of relatively low flow impedance to a corresponding position on the movable porous tape or porous collector medium 24.

A tubular member 26 connects with a suitable pumping means (not shown) for withdrawing gas and electrolyte from the trap and maintains a partial vacuum therein. When the electrolyte is quickly drawn through the microporous tape there is no chance for lateral movement of the liquid or electrolytic solution at the point of emergence from the plates, thereby preventing mixture of the particle bands and loss of zone resolution thereof.

Referring now to FIGURE 3, there is shown, in somewhat schematic form, an electrophoretic separation of a sample introduced into the apparatus. A continuous stream of sample suspended in a suitable liquid carrier is inserted into the interspace 3 through opening 18a and the tube 18. The sample stream enters the electrolytic film and flows down the interspace with the film. As the sample particles pass through the field, applied to the electrolyte by the electrodes 13 and 14, they begin to separate. Neutral particles follow the laminar flow of the electrolyte while negatively or positively charged particles are diverted in accordance with their electrophoretic mobility in the direction of the positive or negative electrodes respectively. There is a uniform flow of buffer solution within the interspace along parallel flow lines. The particles form distinct component bands, such as bands A, B, C and D of the illustrated sample. The individual particles of these bands are moved along with the buffer solution downwardly until they emerge at the outlet opening 3b from between the two plates. These bands are then deposited upon the microporous collector medium 24 in distinctly separated bands or lines for further analysis.

As shown in the arrangement illustrated in FIGS. 1, 2 and 3, the plates are retained substantially in the vertical position. This position is very desirable in a free flowing electrophoresis apparatus adapted for analysis of sample mixtures in which the sample particles are relatively large, such as from 2 to 20 microns in size. When the plates and the orientation of the interspace are other than in the vertical position, there is a tendency for the larger size particles to settle out and attach themselves to the surface of the plates. This, of course, greatly impedes the separation of the mixtures into sample bands, each representing a particular component or group of components. By orienting the plates and the interspace so that flow of the electrolyte is vertically downward the gravitational effects on the larger size particles are substantially mitigated and the separation can be more accurately carried out.

In another embodiment of the invention, as shown schematically in FIGS. 4, 5 and 6, an alternative means is provided for supplying the liquid film to the interspace as well as for collecting it therefrom. A shim 27 formed of a microporous membrane material such as Millipore, acts as a spacer between the plates. In its preferred form the microporous shim 27 surrounds a hole or interspace 3a with the sides 27a of the hole forming an apex 27b at the upper end thereof and diverging in the downward direction for a short distance and then becoming parallel for the greater part of the length of the opening. The section of the interspace defined by the parallel portions of sides 27a may be considered as the electrophoresis space since substantially all of the electrophoretic separation of the sample takes place in this section. The shim also extends outward beyond the edge of plate 2 and forms a moist porous support for the electrodes somewhat in the same manner as filter strip 17 in FIG. 2. In the embodiment illustrated in FIG. 4, the interspace 3a is substantially hexagonal shape and the upper end thereof is of inverted V shape. The sides 27a of the opening are for the most part substantially parallel and the bottom is also of V-shape. The opening could also be substantially O-shaped or in the shape of an inverted U. The film electrolyte is supplied to the interspace by means of a tubular member 30 through inlet opening 30a at the apex of the inverted V, thereafter fanning out to flow in parallel lines down the interspace. Toward the bottom of the interspace, the flow lines converge and the film of liquid is vented or withdrawn at opening 29a via tube 29. By introducing the flowing film at a single point, the arangement of FIG. 4 makes it possible to obtain uniform lateral rates of distribution of flow. The collection of the film at a single point, at the apex of the converging section of the interspace, greatly enhances this objective.

The entire shim 27 is saturated with electrolyte and provides an electrolytic bridge whereby a potential applied to the electrodes 13 and 14 forms a lateral electric field gradient in the interspace between the plates 1 and 2. Means (not shown) are provided for flowing a small quantity of the electrolytic solution down the filter strips 16a and 16b for continually moistening this material. As in the embodiment of FIG. 1, the moistened strips 16a and 16b and moistened shim material are in contact with the electrodes 13 and 14 so that the current flows through the shim material to produce a potential gradient across the opening or hole 27a. The voltage source such as 31 may be applied via a reversing switch 32 and rheostat 33 for purposes of control, the operation of which will be explained in greater detail later in the specification. The sample suspension is injected into the interspace at a first confined point positioned below the electrolyte inlet opening 30a. In the example of FIG. 4 the sample suspension is introduced through opening 18a from tube 18 through one of the plates, such as plate 2 as illustrated.

Means are also provided for withdrawing a portion of the liquid film and sample from between the plates at a point downstream from the first injection tube 18 or opening 18a. This means comprises a tube 28 inserted through a third opening 28a in the front plate 2 and communicating with the interspace 3 for drawing off the stream of the liquid film at some particular region downstream from the position where the sample solution is inserted. The opening 28a, as may best be seen in FIGS. 4 and 5, may be disposed laterally with respect to a line drawn through the axis of the sample inlet opening 18a so that it is designed to intercept a particular sample band, such as sample band C in FIG. 4.

Also, in accordance with this embodiment of the invention, the voltage gradient may be varied within the interspace so that the relative location of the sample bands can be varied. In this manner, the bands may be selectively passed over the opening 28a and withdrawn through the tube 28 for deposition on a suitable collector medium. Variation of the field voltage gradient may be accomplished by any convenient means such as by means of the variable resistance device 33 shown in FIG. 4. As the field strength across the electrolyte film is varied, the deflection of the particles is changed. By properly locating the opening 28a and varying the potential between the electrodes, it is possible to sequentially pass the sample bands over the opening 28a to withdraw certain quantities of the sample bands in a sort of scanning action. In FIG. 4, sample band C is shown being picked off through the opening 28a. A sample is withdrawn through a tube 28 and for convenience of examination may be deposited on a microporous membrane, such as the membrane 24a shown schematically in FIG. 6. The microporous membrane 24a would be passed over a trap, similar to the trap 20, as described with respect to the apparatus of FIG. 1 for disposing of the liquid phase of the withdrawn suspension. The remaining, unselected bands such as B and A converge toward opening 29a and are disposed of via tube 29 together with the flowing liquid film volume.

As may be seen in FIG. 4, power is supplied to the electrodes 13 and 14 by means of a suitable source of direct current, such as the battery 31. Means, such as the reversing switch 32, are provided for reversing the polarity to the electrodes, so that the potential across the interspace 3 may be reversed and, thus, the field force on the sample particles is reversed. By reversing the polarity of the field, it is possible to cause the charged sample particles to migrate in the reverse direction so that the sample bands may be selectively sampled through openings (not shown), similar to opening 28a, communicating with other points between the plates.

If desired, the electrophoresis apparatus of the invention may combine the single-point liquid film feeding arrangement of FIG. 4 with the suction arrangement for film pickup shown in FIG. 1. In this case the hexagonally microporous shim 27 is replaced with a shim of inverted U-shape, and as in FIG. 1 the plates would be chamfered at the bottom and closely adjoin the suction device.

Still another embodiment of the invention is disclosed in FIGS. 7 and 8. In this embodiment, the flow of buffer solution and drainage thereof is similar to that disclosed in FIG. 4. However, in this arrangement, there is provided a substantially different means for detecting the sample constituents forming the separated component bands. In this embodiment, at least one of the flat plates, such as plate 1, is transparent to radiation in a selected wavelength range and means are provided for directing a beam of such radiation within the selected wavelength range along a path traversing the transparent plate at a position where it wil intersect the path of a selected component band so that the selected band modifies the radiation. Means are then provided along the path for detecting the radiation as modified by the selected component band.

As shown in FIGURES 7 and 8, the means for providing a beam of radiation of a selected wavelength comprises a concentrated light source 34 which illuminates a small aperture in a mask 35. A lens 36 may concentrate the beam of light from the aperture on a confined point 38 through the plate 1 which passes light of a predetermined wavelength. Mask 37 blocks out a cone of light in the converging beam. Means in the form of an optical detector 40, including a lens 39 and photocell 41, is disposed in the path of the light as it emerges through plate 2. In the absence of any particles at point 38 which can scatter the incident light, no light reaches the lens 39 and photocell 41 produces no output signal. Electrically connected to the photoelectric detector for receipt of any signal from the photocell is an amplifying and recording device 43. When scattering particles appear at point 38, a portion of the scattered light is directed through lens 39, causing a response in the photocell 41 and a proportional response in the recording apparatus 43. The optical system may be designed to sense even single particles scattering the light and the amplifier and recorder may be adapted to record a signal proportional to the counting frequency. Alternatively, if there are large numbers of particles entering the point of illumination, the total scattered light intensity may be recorded. If the particle band intensity is sufficienly high, the optical system may, as an alternative, respond simply to attenuation of the transmitted light, and may be adapted for such measurements essentially by omitting the mask 37 in FIGURE 7.

As shown in FIGURE 8, the entire optical system including the illuminating and sensing device may be reciprocated laterally to provide a scanning action over a predetermined range of the electrophoresis plates by a motor drive 44 through a suitable coupling means, shown schematically by the dotted line 45. As an alternative, the plate assembly may itself be driven back and forth laterally by a suitable mechanical drive while the optical system remains stationary. In any even, it is contemplated that there be a relative motion of the position of illumination laterally with respect to the particle bands within the interspace between the plates. By this means, a recording may be made of the distribution of particle band intensity relative to lateral position within the plates.

If desired, the illuminating system may be on the same side of the plate assembly as the light sensing system, the particles being then detected by back-scattering of the light. Only one of the plates in this case would need to be transparent. Similarly, if the particle bands are to be detected by attenuation of the light beam (essentially a light absorption measurement) then again the source of illumination may be on the same side as the light detector, and surface of the rear plate would preferably be made reflective, for example, by aluminizing.

In another alterantive arrangement for the optical sensing arrangement, both the plate assembly and the optical system may be stationary, and the bands may be caused to move relative to the point of ilumination by varying the intensity of the electric field, for example by continuously varying the setting of the rheostat 33, such as described with respect to the embodiment disclosed in FIG. 4. It is apparent that the arrangement of FIGURE 7 is applicable not only to electrophoresis of microscopic particle mixtures, but to mixtures of dissolved substances. Thus, in the arrangement of FIGURE 7, the sample may comprise a mixture of proteins, and the light source 34 may comprise a selected narrow band of wavelengths of ultraviolet light. The component fractional bands of individual proteins, being more opaque to the selected ultraviolet radiation than the electrolyte film, will attenuate the optical beam, and produce, via the detector and amplifier-recorder, a recording representative of the type and quantity of the individual protein fractions. For optimum transmission of the ultraviolet light, the plates would be made of fused quartz or silica.

Figure 10:
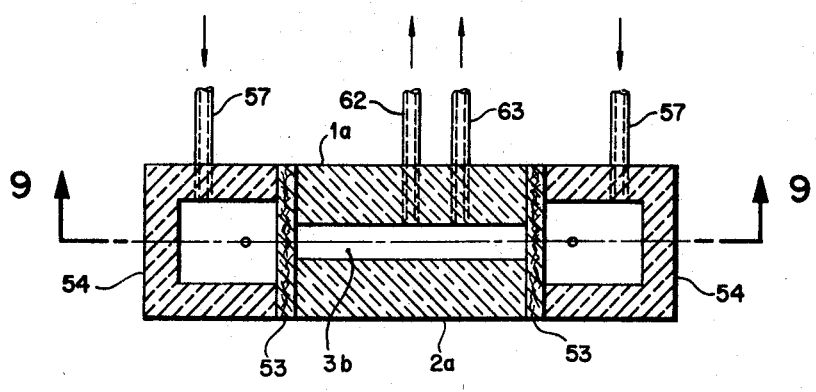
FIG. 10 is a cross-sectional top view, along the plane 10—10, of the apparatus of FIG. 9.

Referring now to FIGS. 9 and 10, there is shown an embodiment of the present invention in which a pair of plates 1a and 2a, fabricated of suitable electrically insulating material, is supported (by means not shown) with the plates in spaced-apart face-to-face, parallel relationship. Disposed between the plates is a means defining an interspace 3b between the plates. The shape of the interspace is similar to that in the embodiments illustrated in FIGS. 4 and 8.

The means for defining the interspace 3b may include a spacer 50 which defines a diverging section of the interspace having an apex 51. Preferably, the spacer 50 is fabricated from a solid substance such as rubber gasket material. The interspace also includes an electrophoresis space, having lateral edges 52 extending from the diverging sections. Preferably, the lateral edges 52 are parallel to insure that the electrolyte injected at the apex 51 is confined to uniform, parallel flow lines in the electrophoresis space.

Any suitable means for applying an electrical field gradient across the electrolyte may be utilized. A preferred means will now be described. Mounted immediately adjacent each lateral edge of the electrophoresis space is an ion-permeable barrier 53 having an inner surface in contact with the electrolyte in the electrophoresis space and an outer surface. As shown in FIGS. 9 and 10, the ion-permeable barrier 53 may be made to extend the entire length and thickness of the assembly comprising the plates 1a and 2a and the gasket 50. The barrier 53 may be fabricated of a material such as dialysis membrane—for example, regenerated cellulose or the like—which does not significantly impede ionic flow while being only very slowly permeable to bulk flow of liquids. Alternatively, ion exchange membrane may be used, the barrier at the anode being selected for impermeability to cations while the barrier at the cathode is anion-impermeable.

Mounted adjacent the outer surface of each ion-permeable barrier 53 is a means 54 defining a chamber 55 in communication with the outer barrier surface. The means 54 may take the form of a housing fabricated of any suitable electrically-insulating material such as glass or Lucite. A wire electrode 56, of platinum or the like, supported by the housing 54, is disposed in each chamber 55 with a portion projecting from the housing. Connected to the projected portion of the electrode 56 is a source of D.C. potential 31a connected in series with a variable resistance 32a.

The chamber 55 contains an electrolyte or buffer solution forming an electrical bridge between the electrode 56 and the ion-permeable barrier 53. In order to continuously flush the chamber 55, the buffer solution may be made to continuously flow through the chamber. For this purpose, an inlet tube 57 is provided near the bottom of the chamber 55 and an outlet tube 58 is provided near the top. The buffer solution entering the chamber 55 through the tube 57 flows upwardly in the chamber 55 and exits via the tube 58. Although the direction of flow may be reversed, it has been found desirable to flow the buffer solution in an upward direction to flush from the chamber any gas bubbles which might form during operation of the apparatus.

Mounted in the plate 1a and in communication with the interspace 3b at the apex 51, is an electrolyte inlet tube 59 serving to introduce electrolyte into the interspace in the manner described earlier in connection with the embodiments of FIGS. 4 and 8. A sample inlet tube 60, supported by the plate 1a, is in communication with a point in the interspace downstream of the apex 51. The sample mixture injected into the interspace via the tube 60 enters the flowing electrolyte sheet and, under the influence of the electrical potential gradient applied across the sheet, electrophoretically separates into component bands such as, for example, A, B and C.

Means communicating with the electrophoresis space is provided for withdrawing the electrolyte and separated sample components. This may take the form of the arrangement depicted in FIG. 1 in which either a stationary or moving collector medium is mounted in close proximity with the lower edge of the interspace. Alternatively, a structure as shown in FIG. 9 may be provided. A spacer 60, made of a suitable leakproof material such as rubber gasketing, is sandwiched between the plates 1a and 2a opposite the spacer 50. The inner edge of the spacer 60 is contoured so as to provide the interspace with a V-shaped or converging section having an apex 61. A tube 62, mounted in the plate 1a and in communication with the interspace at the apex 61, is utilized to vent or withdraw the electrolyte and the separated component bands designated by the letters A, B and C. This arrangement is similar to that depicted in FIG. 8 in which all of the electrolyte and all of the particle bands are withdrawn by a single vent means. Any suitable analyzing means, such as the optical system described in connection with FIGS. 7 and 8 may be used to analyze quantitatively and qualitatively the component bands produced when the sample injected at point 60 is electrophoretically separated.

As an alternative to the preceding, it may be desirable to collect the particles of one or more of the component bands. A structural arrangement for accomplishing this is shown in FIG. 9 and is similar to the collection technique employed in the embodiments of FIGS. 4–6. In accordance with this technique, one or more collection tubes may be mounted in the plate 1a in communication with the interspace downstream of the sample injection point 60. A single tube 63 is shown in FIGS. 9 and 10 for exemplary purposes. It will be seen that the potentiometer 33a has been adjusted so as to bring particle band B in registry with the sample withdrawal tube 63. A portion of the electrolyte will, of course, be withdrawn along with the particles of band B. The remainder of the electrolyte and any remaining sample components, which would include particle bands A and C in the schematic representation of FIG. 9, are withdrawn via the tube 62.

By the present invention there is provided an improved apparatus for producing a uniform flow of electrolyte solution between electrophoretic plates. The apparatus is adapted to a number of different means for detecting and monitoring the electrophoretic particles distribution of a sample flowing therethrough. Because the electrophoresis plate may be oriented in the vertical direction, the apparatus may be utilized for the detection, study and monitoring of relatively large sample particles which, because of the vertical orientation of the plates, do not settle on the walls of the apparatus.

While in accordance with the patent statutes there has been described what at present are considered to be the preferred embodiments of the invention, it will be obvious to those skilled in the art that various changes and modifications may be made therein without departing from the invention and it is, therefore, the aim of the appended

What is claimed is:

1. In an apparatus for continuous electrophoresis, the combination comprising
   a pair of substantially flat plates of electrically insulating material;
   means supporting said plates in spaced-apart face-to-face relationship and substantially parallel to each other to define an interspace;
   means for feeding a liquid from a single point source in steady laminar flow as a sheet through said interspace, said interspace having a characteristic low impedance to said flow, said feed means including
      an element permeable to said liquid and of relatively high flow impedance compared with the flow impedance of said space,
      means for applying liquid flowing from a said single point source to an input side of said permeable element, and
      means conducting said liquid from a plurality of positions on an output side of said permeable element along short and substantially equal flow paths of relatively low impedance to a corresponding plurality of positions along a flow starting line on said interspace;
   means applying an electric potential gradient to said liquid flowing in said interspace with a component normal to said laminar flow and parallel to the adjoining faces of said plates; and
   means for injecting a mixture to be analyzed at a confined position into said interspace.

2. An apparatus as defined in claim 1 including
   means withdrawing said flowing liquid sheet from said interspace along a flow output line, comprising
      a second element permeable to said liquid and of relatively high impedance compared with the flow impedance of said interspace; and
      means conducting said liquid from a plurality of positions on said output line along short and substantially equal flow paths of relatively low flow impedance to a corresponding plurality of positions on said second permeable element.

3. An apparatus as defined in claim 1 in which
   said means supporting said plates in face-to-face relationship is adapted to support said plates in the vertical position so that laminar flow of the liquid electrolyte through said interspace is vertically downward from said feed means thereby eliminating the tendency for large sample particles to settle and attach themselves to the surface of said plates.

4. In an apparatus for continuous electrophoresis, the combination comprising
   a pair of plates, each having a substantially flat surface;
   means supporting said plates with said flat surfaces disposed in spaced-apart, face-to-face and substantially parallel relationship to define an interpsace;
   means for introducing a continuous flow of electrolyte into said interspace to form a flowing sheet of electrolyte between said plates, said flowing sheet emerging along an outlet edge of said interspace;
   means for applying an electrical field gradient transverse of said flowing sheet;
   means injecting a suspension of heterogeneous particles at a confined point into said sheet for fractionation thereof into component particle bands;
   a collector medium permeable to said electrolyte but impermeable to said particles; and
   means supporting said collector medium in close juxtaposition to said outlet edge of said interspace for collecting said particle bands at discrete positions on said collector medium.

5. An apparatus as defined in claim 4 in which
   said outlet edge of said interspace closely juxtaposed with said medium is defined by two adjoining beveled edges of said plates positioned substantially in back-to-back relationship to form a V-shaped cross-section having said outlet opening in the center thereof, the apex of the V being closely adjacent to said medium.

6. An apparatus as defined in claim 4 in which
   said plate supporting means is adapted to orient said interspace vertically.

7. A combination as defined in claim 4 in which
   said suspension is continuously injected into said electrolyte sheet; and
   said collector medium is movable past the outlet edge of said interspace for continuously intercepting and collecting said particle bands at discrete positions on said medium.

8. A combination as defined in claim 7 in which
   said means supporting said movable collector medium in close juxtaposition to said outlet edge of said interspace includes
      a trap,
      a porous support member disposed substantially across said trap for supporting said collector medium, and
      means for creating a partial vacuum in said trap so that said liquid electrolyte is quickly drawn through said permeable medium and said porous surface member into said trap.

9. In an apparatus for continuous electrophoresis, the combination comprising
   a pair of plates each having a substantially flat surface;
   means supporting said plates in spaced-apart face-to-face relationship and substantially parallel to each other to define an interspace;
   means for introducing an electrolyte at a first single point;
   means interconnecting said electrolyte introduction point with said interpsace for feeding a sheet of electrolyte into said interspace, said electrolyte sheet flowing in parallel flow lines in said space with uniform velocity and pressure transverse of the direction of flow of said sheet;
   means in communication with said interspace for injecting at a single point in said electrolyte sheet a sample to be separated into its components;
   means for applying a transverse electric field gradient to said liquid flowing in said interspace;
   means downstream from said first point for withdrawing a portion of said liquid sheet from a second confined point communicating with said interspace; and
   means for varying said electric field gradient for laterally shifting said sample component bands in a desired direction thereby causing at least one of said bands to move into communication with said second confined point for withdrawal with a portion of said liquid sheet.

10. An apparatus as defined in claim 9 in which
    said field gradient varying means comprises means for continuously varying a voltage applied to said liquid flowing in said interspace so that said bands are continuously and sequentially shifted to said second confined point.

11. An apparatus as defined in claim 9 in which
    said withdrawing means comprises an evacuated tube withdrawing said liquid portion through a perforation in one of said plates.

12. An apparatus as defined in claim 9 in which
    said liquid feeding means includes an inlet opening communicating with said interspace adjacent one end portion thereof for introducing a continuous flow of said liquid into said interspace, said interspace being contoured so that said liquid fans out in said interspace to form a relatively wide laminar flowing sheet between said plates.

13. An apparatus as defined in claim 12 in which said interspace is defined by a shim of microporous material disposed between said plates, said shim having an opening therein defining said interspace, said opening having the sides thereof adjacent one end of said plates diverging for a short distance to define an apex adjacent one end of said plates;
and which includes
an inlet opening communicating with said apex of said shim for introducing a continuous flow of liquid electrolyte into said interspace to form said laminar flowing sheet in contact with said shim.

14. An apparatus as defined in claim 13 in which said opening in said shim is substantially hexagonal in shape and said inlet opening for introducing said electrolyte into said interspace is adjacent an apex formed by two intersecting sides of said hexagonal opening;
and which includes
outlet means for withdrawing the remainder of said liquid electrolyte and any remaining component bands, said outlet means being adjacent and opposite apex formed by two intersecting sides of said hexagonal opening in said shim.

15. In an apparatus for continuous flow electrophoresis, the combination comprising
a pair of plates each having a substantially flat surface;
means supporting said plates with said substantially flat surfaces in spaced-apart, face-to-face, substantially parallel relationship to define an electrophoresis space;
means for introducing an electrolyte at a single point;
means interconnecting said electrolyte introduction point with said electrophoresis space for feeding a sheet of electrolyte into said electrophoresis space, said electrolyte sheet flowing in parallel flow lines in said space with uniform velocity and pressure transverse of the direction of flow of said sheet;
means in communication with said electrophoresis space for injecting at a single point in said electrolyte sheet a sample to be separated into its components;
means electrically connected with said electrolyte sheet for applying an electrical potential gradient across said electrolyte sheet to electrophoretically separate said sample into component bands; and
means in communication with said electrophoresis space for withdrawing said electrolyte and said component bands.

16. A combination as defined in claim 15 in which said means for feeding said electrolyte into said electrophoresis space comprises a spacer between said plates, said spacer having a contour diverging from an apex to said electrophoresis space, said electrolyte being introduced at said apex and fanning out within said diverging contour.

17. A combination as defined in claim 16 in which said means for withdrawing said electrolyte and component bands comprises a second spacer contoured to converge from said electrophoresis space to an apex, said second spacer being positioned opposite said first-mentioned spacer, said means further comprising an outlet communicating with said apex of said convergently-contoured spacer.

18. A combination as defined in claim 17 in which said spacers are formed of solid gasket material.

19. In an apparatus for continuous flow electrophoresis, the combination comprising
a pair of plates each having a substantially flat surface;
means supporting said plates with said substantially flat surfaces in spaced-apart, face-to-face, substantially parallel relationship to define an electrophoresis space;
means for introducing an electrolyte at a single point;
means interconnecting said electrolyte introduction point with said electrophoresis space for feeding a sheet of electrolyte into said electrophoresis space, said electrolyte sheet flowing in parallel flow lines in said space with uniform velocity and pressure transverse to the direction of flow of said sheet;
means in communication with said space for injecting at a single point in said electrolyte sheet a sample to be separated into its components;
means electrically connected with said electrolyte sheet for applying an electrical potential gradient across said electrolyte sheet to electrophoretically separate said sample into component bands;
means in communication with said electrophoresis space for collecting a portion of said electrolyte and at least one of said component bands; and
means in communication with said space for withdrawing the remainder of said electrolyte and any remaining component bands.

20. A combination as defined in claim 19 in which said means for feeding said electrolyte into said electrophoresis space comprises a spacer between said plates, said spacer having a contour diverging from an apex to said electrophoresis space, said electrolyte being introduced at said apex and fanning out within said diverging contour.

21. A combination as defined in claim 20 in which said means for collecting a portion of said electrolyte and at least one of said component bands includes outlet means communicating with said electrophoresis space at at least one point downstream of said sample injection point.

22. A combination as defined in claim 20 in which said means for withdrawing the remainder of said electrolyte and any remaining component bands comprises a second spacer contoured to converge from said electrophoresis space to an apex, said second spacer being positioned opposite said first-mentioned spacer, said means further comprising an outlet communicating with said apex of said convergently-contoured spacer.

23. A combination as defined in claim 22 in which said spacers are formed of solid gasket material.

24. In an apparatus for continuous electrophoresis, the combination comprising:
a pair of substantially flat plates, at least one of which is transparent to radiation in a selected wavelength range;
means supporting said plates in spaced-apart face-to-face relationship and substantially parallel to each other to define an interspace;
means for feeding a liquid as a steady laminar flow sheet through said interspace;
means applying an electrical field gradient to said liquid flowing in said interspace with a component normal to said laminar flow and parallel to the adjoining faces of said plates;
means for injecting particles to be analyzed into said interspace for continuous electrophoretic fractionation into sample component bands;
means for radiating a beam of radiation within said selected wavelength range toward said transparent plate;
means for confing said beam of radiation to a narrow path and directing said beam toward a point in a selected one of said sample component bands so that said selected sample band scatters said beam of radiation, and
photosensitive means for detecting said scattered radiation.

25. A combination as defined in claim 15 in which said means for feeding said electrolyte into said electrophoresis space comprises a porous membrane permeable to said liquid and of relatively high flow impedance compared with the flow impedance of said space disposed directly above the opening to said space and having one surface thereof adjacent to the upper portion of a flat surface of one of said plates.

26. A combination as defined in claim 24 comprising in addition scanning means for moving said photo sensitive means laterally with respect to said plates to monitor the sample bands carried by the laminar flow sheet.

References Cited

UNITED STATES PATENTS

| | | | |
|---|---|---|---|
| 2,555,487 | 6/1951 | Haugaard et al. | 204—299 |
| 2,875,144 | 2/1959 | Karler | 204—299 |
| 2,879,217 | 3/1959 | Durrum et al. | 204—299 |
| 2,884,367 | 4/1959 | Karler et al. | 204—299 |
| 3,085,956 | 4/1963 | Caplan | 204—299 |
| 3,125,500 | 3/1964 | Grassman et al. | 204—299 |
| 3,226,556 | 12/1965 | Rosin | 204—180 |
| 3,255,100 | 6/1966 | Raymond | 204—301 |
| 3,287,244 | 11/1966 | Mel | 204—299 |
| 3,320,148 | 5/1967 | Skeggs | 204—299 |
| 3,320,149 | 5/1967 | Isreeli | 204—299 |

JOHN H. MACK, Primary Examiner

A. C. PRESCOTT, Assistant Examiner

U.S. Cl. X.R.

204—180